United States Patent [19]

Haddad et al.

[11] Patent Number: 4,793,915
[45] Date of Patent: Dec. 27, 1988

[54] SHORT CONTACT TIME FLUID CATALYTIC CRACKING PROCESS

[75] Inventors: James H. Haddad, Princeton Junction; Hartley Owen, Belle Mead, both of N.J.

[73] Assignee: Mobil Oil Corporation, New York, N.Y.

[21] Appl. No.: 3,677

[22] Filed: Jan. 15, 1987

[51] Int. Cl.$^4$ ............................................. C10G 11/18
[52] U.S. Cl. .................... 208/161; 208/164; 208/153
[58] Field of Search ............... 208/113, 161, 163, 164, 208/157; 422/140

[56] References Cited

U.S. PATENT DOCUMENTS

| | | | |
|---|---|---|---|
| 2,337,684 | 12/1943 | Scheineman | 196/52 |
| 2,606,097 | 8/1952 | Goodson et al. | 23/1 |
| 3,123,547 | 3/1964 | Palmer et al. | 208/78 |
| 3,243,265 | 3/1966 | Annesser | 208/164 X |
| 3,826,738 | 7/1974 | Zenz | 208/153 |
| 3,856,659 | 12/1974 | Owen | 208/80 |
| 4,035,284 | 7/1977 | Gross et al. | 208/120 |
| 4,070,159 | 1/1978 | Meyers et al. | 208/161 |
| 4,116,814 | 9/1978 | Zahner | 208/78 |
| 4,206,174 | 6/1980 | Heffley et al. | 422/144 |
| 4,219,407 | 8/1980 | Haddad et al. | 208/161 |
| 4,295,961 | 10/1981 | Fahrig et al. | 208/161 |
| 4,313,910 | 2/1982 | Dries et al. | 422/147 |
| 4,394,349 | 7/1983 | Cartmell | 208/161 |
| 4,404,095 | 9/1983 | Haddad et al. | 208/161 |
| 4,482,451 | 11/1984 | Kemp | 208/161 |
| 4,500,423 | 2/1985 | Krug et al. | 208/161 |
| 4,502,947 | 3/1985 | Haddad et al. | 208/161 |
| 4,572,780 | 2/1986 | Owen et al. | 208/161 |
| 4,605,491 | 8/1986 | Haddad et al. | 208/161 |

FOREIGN PATENT DOCUMENTS

0180355 5/1986 European Pat. Off. .

Primary Examiner—Glenn Caldarola
Attorney, Agent, or Firm—Alexander J. McKillop; Michael G. Gilman; Malcolm D. Keen

[57] ABSTRACT

A process and apparatus for fluid catalytic cracking (FCC) of a hydrocarbon feed. The process and apparatus includes a riser which upwardly discharges into a deflector baffle located within a stripping vessel. The stripping vessel is located within a disengaging vessel. The deflector baffle is spaced from the riser and the stripping vessel. Preferably, the deflector baffle is shaped similarly to a large bubble cap. Catalyst passes downwardly from the baffle into a stripping zone within a lower portion of the stripping vessel. Hydrocarbons stripped from the catalyst pass upwardly aaway from the stripping zone, then pass to a cyclone located outside the stripping vessel and then discharge from the disengaging vessel.

8 Claims, 7 Drawing Sheets

SHORT CONTACT TIME FLUID CATALYTIC CRACKING PROCESS

BACKGROUND OF THE INVENTION

1. Field of the Invention

The present invention relates to a process and apparatus for a short contact time fluid catalytic cracking (FCC) unit. More particularly, the present invention relates to a process and apparatus for reducing contact time between catalyst and hydrocarbon materials within an FCC disengaging vessel.

2. Discussion of the Prior Art

By way of background, the hydrocarbon conversion catalyst usually employed in a FCC installation is preferably a high activity crystalline zeolite catalyst of a fluidizable particle size. The catalyst is transferred in suspended or dispersed phase condition with a hydrocarbon feed generally upwardly through one or more riser conversion zones (FCC cracking zones) providing a hydrocarbon residence time in each conversion zone in the range of 0.5 to about 10 seconds and usually less than about 8 seconds. High temperature riser hydrocarbon conversions, occurring at temperatures of at least 1,000° F. or higher and a 0.5 to 4 seconds hydrocarbon residence time in contact with the catalyst in the riser, are desirable for some operations before initiating separation of vaporous hydrocarbon product materials from the catalysts.

Rapid separation of catalyst from hydrocarbons discharged from a riser conversion zone is particularly desirable for restricting hydrocarbon conversion time. During the hydrocarbon conversion, carbonaceous deposits accumulate on the catalyst particles and the particles entrain hydrocarbon vapors upon removal from the hydrocarbon conversion zone. The entrained hydrocarbons are subjected to further contact with the catalyst until they are removed from the catalyst by a separator, such as cyclonic equipment, or stripping gas in a separate catalyst stripping zone or both. Hydrocarbon conversion products separated and stripped from the catalyst are combined and passed to a product fractionation step. Stripped catalyst containing deactivating amounts of carbonaceous material, hereinafter referred to as coke, is then passed to a catalyst regeneration operation.

Of particular interest has been the development of methods and systems for separating catalyst particles from a gasiform mixture of catalyst particles and vaporous hydrocarbon product which is discharged from the riser. Efficient separating conditions are desirable to separate high activity crystalline zeolite catalyst particles to reduce overcracking of hydrocarbon conversion products and promote the recovery of desired products of a hydrocarbon conversion operation.

Various processes and mechanical means have been employed heretofore to effect rapid separation of the catalyst phase from the hydrocarbon phase, at the termination of the riser conversion zone, to minimize contact time of the catalyst with cracked hydrocarbons.

U.S. Pat. No. 4,502,947 to Haddad et al discloses a closed cyclone fluid catalytic cracking catalyst separation method and apparatus and is incorporated herein by reference. In the closed cyclone method and apparatus, hydrocarbon product from a riser is separated from catalyst and discharged from a disengaging vessel without substantially passing into an atmosphere of the disengaging vessel. Preventing passage of the hydrocarbon into the atmosphere of the disengaging vessel reduces time for the hydrocarbon products being subjected to high temperature cracking in the disengaging vessel, and to contact with catalyst in the atmosphere of the disengaging vessel.

U.S. Pat. No. 4,572,780 to Owen et al discloses a method and apparatus for fluid catalytic cracking of a hydrocarbon feed in an open or closed system and is incorporated herein by reference. The method and apparatus includes a multistage stripper system. The multistage stripper system comprises a means for spinning a gasiform mixture of catalyst and cracked hydrocarbons exiting from a riser, a first means for stripping the spun gasiform mixture, and a means for deflecting the gasiform mixture to separate catalyst from the cracked hydrocarbons. A downstream end of a riser conversion zone may terminate within a stripper vessel located within a disengaging vessel (reactor vessel).

A need exists for developing new systems, for decreasing contact time of catalyst and hydrocarbon products, particularly useful in modifying existing designs. Short contact time reactor designs are becoming increasingly valuable, particularly as the technology progresses to employing higher reaction temperatures and heavier feedstocks.

SUMMARY OF THE INVENTION

It is an object of the present invention to provide a process and apparatus to promote disengagement of catalyst from hydrocarbon conversion products prior to passing the hydrocarbon conversion products into a riser cyclone.

It is a further object of the present invention to provide a process and apparatus to downwardly deflect catalyst discharged from a riser to a first catalyst stripping zone prior to passing hydrocarbon conversion products to the riser cyclone.

In its process aspects, the present invention upwardly discharges a suspension of catalyst and hydrocarbon from a riser. The discharged suspension then contacts a deflector baffle, which is located above a downstream end of the riser, to cause the suspension to change direction, thereby downwardly directing the suspension. This achieves an initial degree of catalyst and hydrocarbon segregation because after the suspension exits the deflector baffle, the majority of the catalyst continues downwardly to a first stripping zone located in a first stripping vessel which encloses the deflector baffle. Meanwhile, as the suspension discharges from the deflector baffle, a first vapor portion of hydrocarbon conversion product turns upwardly away from the first stripping zone. In the first stripping zone, hydrocarbons entrained with the catalyst are separated and passed upwardly and away from the first stripping zone and exit through a side opening which leads to a riser cyclone, while the catalyst continues downwardly. The first stripping vessel is enclosed within a disengaging vessel. In the cyclone, a portion of catalyst entrained with the discharged hydrocarbons is separated to form a separated catalyst stream and a gasiform remainder of the hydrocarbons. The process may employ an open cyclone system wherein the remainder passes into the atmosphere of the disengaging vessel. Preferably the process employs a closed cyclone system which prevents adding the remainder to the disengaging vessel atmosphere. Optionally, the gasiform material from the disengaging vessel atmosphere may pass into the stripping vessel through an opening in a top of the stripping vessel. The remainder and gasiform material from the disengaging vessel atmosphere are discharged from the disengaging vessel.

Catalyst stripped in the first stripping zone then may exit the disengaging vessel or pass into a second stripping zone. After stripping, the catalyst may pass to regeneration.

In its apparatus respects, the present invention achieves the above and other objectives with an elongated tubular riser, the downstream end of which terminates below a deflector baffle. The deflector baffle is located within a stripping vessel and the stripping vessel is located within a disengaging vessel. Riser cyclones are in direct communication with the stripping vessel by means of a conduit attached at one end to the stripping vessel and attached to the riser cyclone at another end. The baffle, stripping vessel and riser cyclones may form an open cyclone system. Preferably the baffle, stripping vessel and riser cyclone provide a closed cyclone system, thereby preventing substantial adding of hydrocarbon conversion products from the riser to an atmosphere of the disengaging vessel. Optionally the stripping vessel is provided with an opening in its upper portion and thereby communicates with the atmosphere of the disengaging vessel. If such an opening is provided the upper portion of the stripping vessel is operated at a lower pressure than that of the disengaging vessel so that vapor passes from the disengaging vessel into the stripping vessel.

In addition, both the process and apparatus of the invention can be operated in compact form to facilitate retrofit into catalytic reactors which are too small for retrofitting with conventional technology. Furthermore, by preferably employing a deflector baffle which generally looks like an oversized bubble cap, the present invention provides an inexpensive way to deflect catalyst. Employing this deflector baffle in conjunction with a stripping vessel located within a disengaging vessel, and a closed cyclone system, results in quick separation of catalyst from hydrocarbon product. If desired, catalyst from the first stripping zone may pass to a second stripping zone either internal or external to the disengaging vessel, prior to catalyst regeneration. Other objects, advantages and process and apparatus aspects of the present invention will be more clearly understood from the following detailed description of the invention which is provided in connection with the accompanying drawings.

DETAILED DESCRIPTION OF THE PREFERRED EMBODIMENTS

Figure 1:
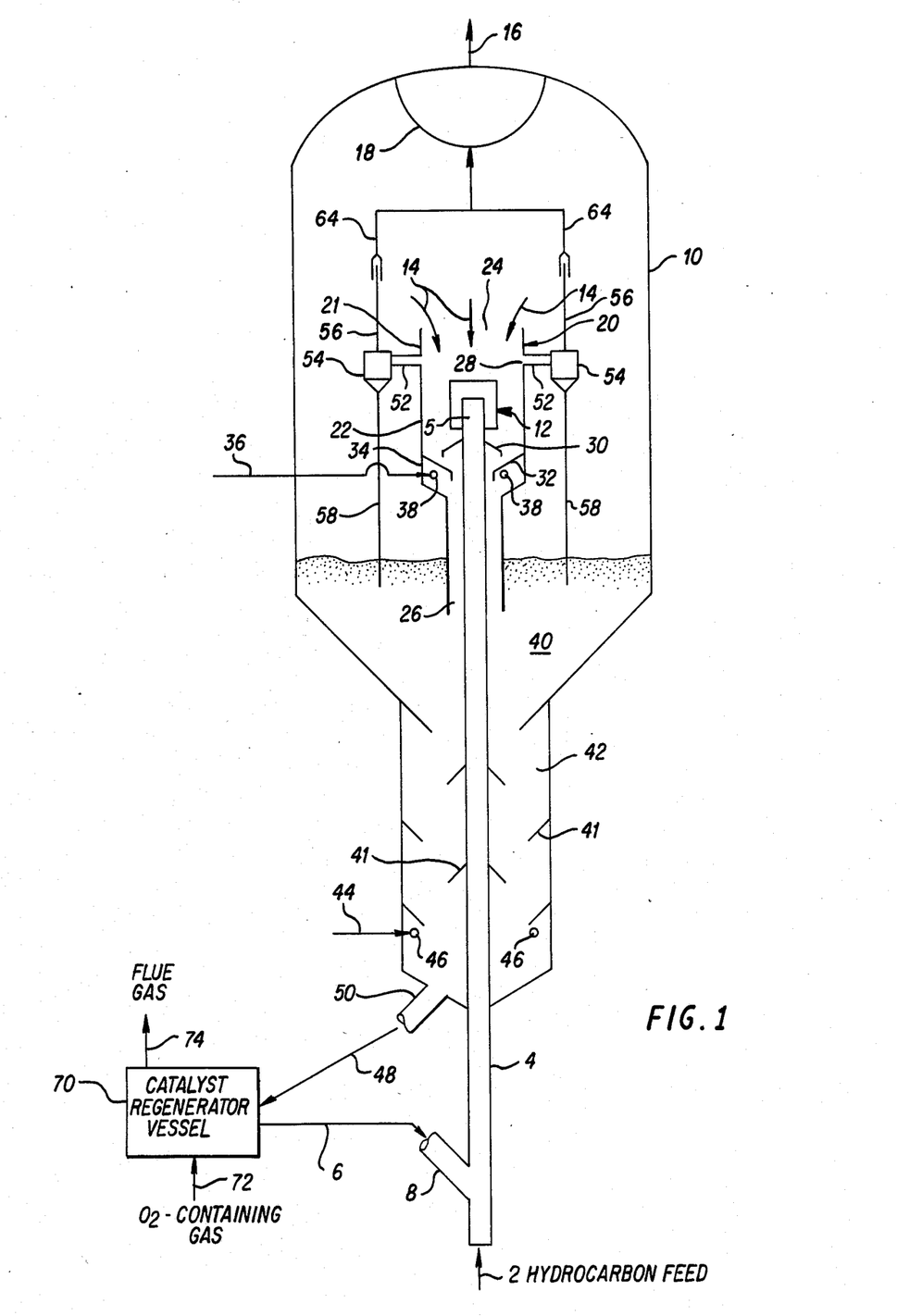
FIG. 1 is a cross-sectional view of a first embodiment of a fluid catalytic cracking (FCC) system of the present invention employing a deflector baffle, stripping vessel and riser cyclones connected to form a closed cyclone system within a disengaging vessel.
Figure 2:
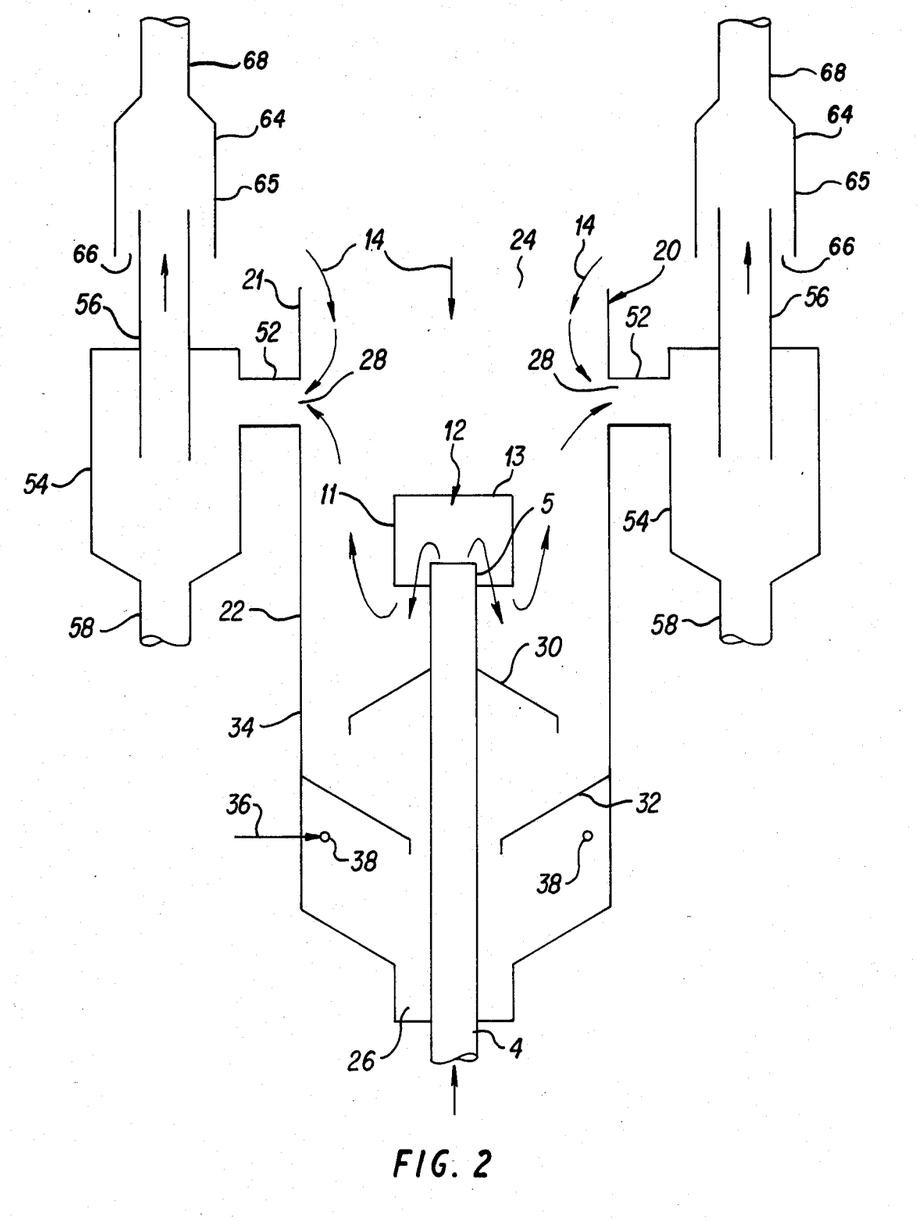
FIG. 2 is a detailed version of the deflector baffle, stripping vessel and riser cyclones of FIG. 1.
Figures 4, 5, 6:
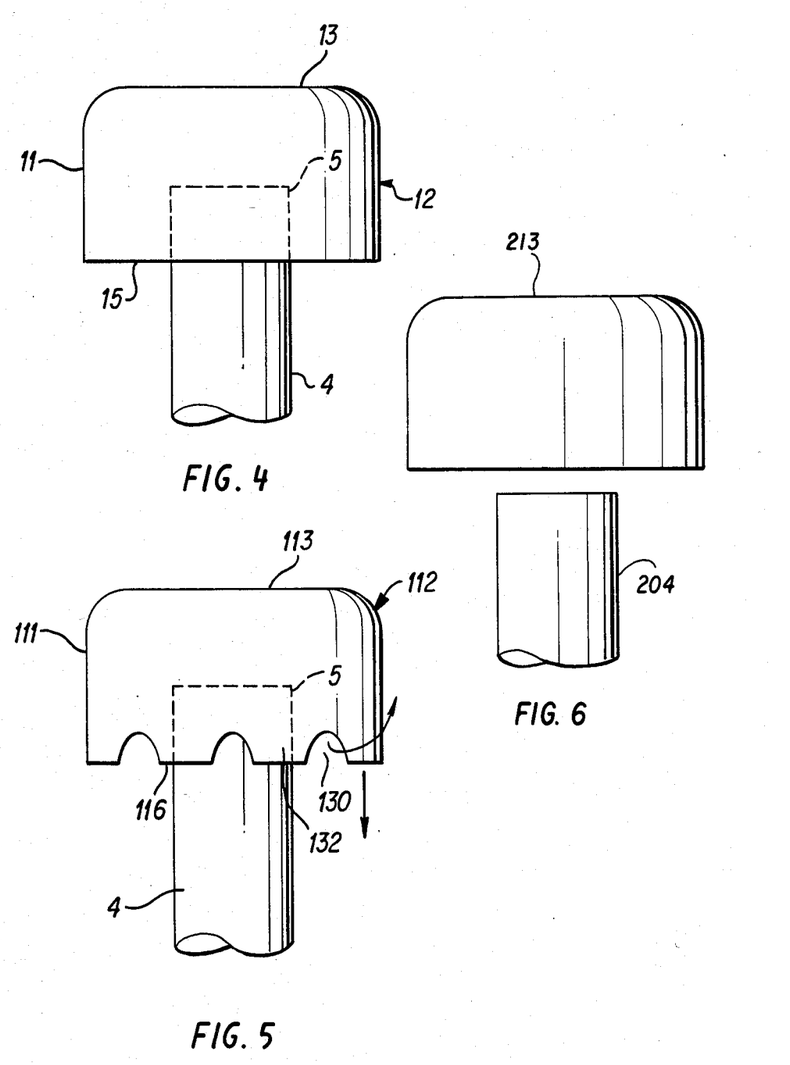
FIG. 4 is a detailed side view of the deflector baffle and riser of FIGS. 1-3.
FIG. 5 is a side view of a modification of the deflector baffle of FIG. 4.
FIG. 6 is a side view of a modification of the deflector baffle of FIG. 4.

Referring now more particularly to the drawings, wherein like numerals represent like elements throughout the views, FIGS. 1-2 and 4 illustrate a first embodiment of an apparatus for performing the process of the present invention. Hydrocarbon feed 2 passes into an elongated tubular riser 4 where it combines with catalyst stream 6 which passes into riser 4 through a catalyst conduit 8. Catalyst stream 6 comes from a fluid catalytic cracking regenerator vessel 70 with or without addition of fresh catalyst thereto. Conduit 8 is attached to the riser 4. The hydrocarbon feed 2 and regenerated catalyst stream 6 combine and pass upwardly at fluid catalytic cracking conditions of pressure, temperature and residence time through the riser 4. This cracks a portion of the hydrocarbon feed to cracked hydrocarbon products. The mixture of catalyst and cracked hydrocarbon products discharges upwardly from the riser 4 into a deflector baffle 12 which is located within a stripping vessel 20 and spaced from both riser 4 and vessel 20. Deflector baffle 12 then downwardly directs the discharged mixture towards a lower portion 34 of the stripping vessel 20. Lower portion 34 defines a first stripping zone. The stripping zone preferably comprises tray 30 which is attached to the riser 4 and tray 32 which is attached to sidewalls 22 of stripping vessel 20. Preferably the trays 30, 32 are perforated. Preferably more than two trays are employed. In the first stripping zone, the downwardly directed catalyst contacts with stripping gas provided by stripping gas conduit 36 attached to stripping gas header 38. Hydrocarbons adhering or entrained along with the downwardly directed catalyst are stripped away from this catalyst and pass upwardly away from lower portion 34. The stripped catalyst however, continues downwardly and exits through a lower opening 26 of the stripping vessel 20. The lower opening 26 is submerged in a catalyst bed 40 located within the disengaging vessel 10.

The stripped catalyst discharged from opening 26 then continues downwardly through the disengaging vessel 10 to a second stripping zone defined by a lower portion 42 of the vessel 10. The stripping zone is provided with trays 41 which are preferably perforated. In the lower portion 42, the catalyst contacts with a second stripping gas stream which passes through a second stripping gas conduit 44 attached to a second stripping gas header 46. This twice stripped catalyst then forms catalyst exit stream 48 which discharges from the vessel 10 through a catalyst exit conduit 50 and passes to the catalyst regenerator vessel 70 where it contacts with a molecular oxygen ($O_2$)-containing gas stream 72 at typical fluid catalytic cracking catalyst regenerator conditions, to form a flue gas stream 74 and regenerated catalyst stream 6.

Meanwhile, hydrocarbon conversion product stripped away from the catalyst in the first stripping zone, passes upwardly to an upper portion 21 of the stripping vessel 20. The upper portion 21 is preferably between a top opening 24 and the baffle 12. In the upper portion 21, the stripped hydrocarbon conversion product combines with vapor streams 14 which pass from the atmosphere of the disengaging vessel through top opening 24 into vessel 20. In addition to passing the vapor streams 14 into the vessel 20 through opening 24, gasiform material from the disengaging vessel atmosphere passes through an annulus 66 defined by a cyclone overhead conduit 56 preferably inserted into an upstream end 65 of a closed conduit 64. Upstream end 65 of closed conduit 64 may be axially aligned with cyclone overhead conduit 56. Meanwhile, the combined streams of stripped hydrocarbon conversion product, and vapor stream 14 in upper portion 21 of vessel 20 exit the stripping vessel 20 through riser cyclone inlet conduit 52 attached to an upper portion of sidewalls 22. The sidewalls 22 of stripping vessel 20 define the top opening 24 through which vapor stream 14 passes into the stripping vessel 20. Pressure at the top opening 24 of the stripping vessel 20 is lower than the pressure in the atmosphere of disengaging vessel 10 so that stream 14 passes into the stripping vessel 20, rather than vapor in the stripping vessel 20 passing into the disengaging vessel 10 atmosphere.

A portion of cracked hydrocarbon product immediately separates from the downwardly directed mixture when it discharges from deflector baffle 12 and passes upwardly towards side opening 28 of the stripping vessel 20. This upwardly passing portion combines with disengaging vessel stream 14 and the stripped hydrocarbons and then passes into the riser cyclone inlet conduit 52 to a riser cyclone 54. In cyclone 54 a portion of catalyst entrained in the combined stream is separated and passes downwardly through a dipleg 58 to the catalyst bed 40 therebelow. The remaining hydrocarbon gases pass upwardly through cyclone overhead conduit 56 directly into the conduit 64 having the upstream end 65 and a downstream portion 68, to a disengaging vessel plenum chamber 18 and then to a disengaging vessel overhead conduit 16 through which it discharges from the disengaging vessel 10. An atmosphere of the plenum chamber 18 is separate from the disengaging vessel 10 atmosphere.

The deflector baffle 12 is enclosed within the stripping vessel 20, the stripping vessel 20 is located within the disengaging vessel 10, the upper portion 21 of the stripping vessel 20 is at a lower pressure than the atmosphere of the disengaging vessel, and the cyclone inlet conduit 52, cyclone overhead conduit 56 and conduit 64 are closed conduits. Thus, passage of hydrocarbon conversion products into the atmosphere of the disengaging vessel 10 is substantially prevented. This provides a closed cyclone system which minimizes the residence time of the hydrocarbons in the disengaging vessel and minimizes contact of hydrocarbon product with catalyst in the atmosphere of the disengaging vessel 10. Minimizing this residence time and contact time minimizes overcracking. Also inserting conduit 56 into conduit 64 and providing an annulus 66 provides space to accommodate thermal expansion of disengaging vessel internals such as the riser 4.

FIG. 2 shows a detailed side view of the embodiment of FIG. 1. FIG. 2 shows that the preferable embodiment of the deflector baffle 12 has a top wall 13 attached to sidewalls 11. Most preferably, sidewalls 11 are cylindrical. The sidewalls 11 preferably overlap a downstream end 5 of riser 4. This forms an annular opening between the sidewalls 11 and riser 4.

Regenerated catalyst stream 6 is typically a hot regenerated catalyst, at a temperature of at least 1200° F. (649° C.), preferably 1250°-1350° F. (677°-732° C.), to form a gasiform mixture at a temperature of at least 980° F. (527° C.) in the riser 4.

Figure 3:
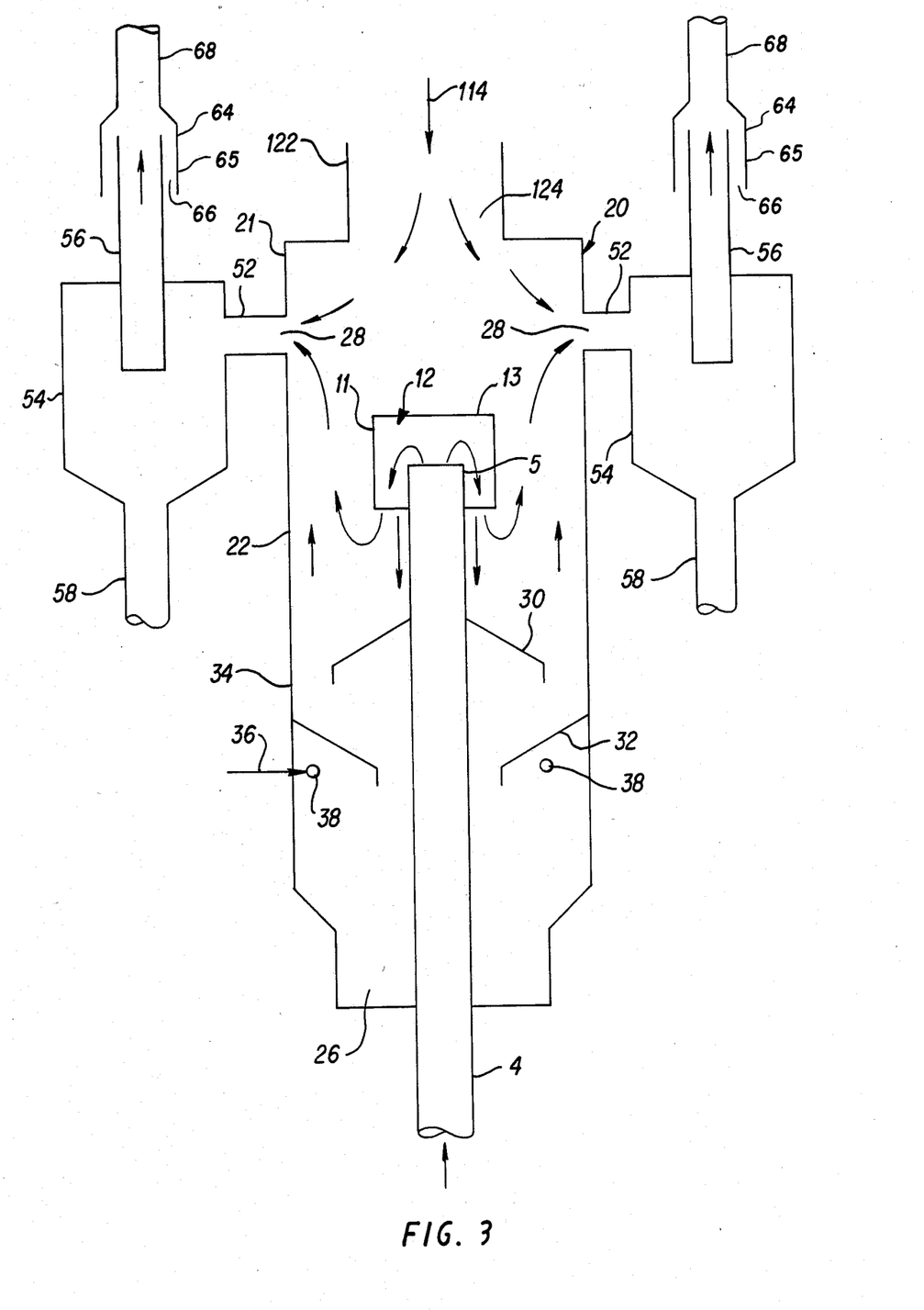
FIG. 3 is a second embodiment of the present invention which is a modification of the embodiment of FIG. 2.

FIG. 3 discloses a second embodiment of the present invention which is a modification of that shown by FIG. 2. FIG. 3 shows that the stripping vessel 20 has an optional top wall 120 attached to the top of the sidewalls 22 to define a top opening 124 through which a catalyst disengaging vessel atmosphere stream 114 passes from the atmosphere of the disengaging vessel 10 into the stripping vessel 20. Furthermore, an inlet conduit 122 is optionally provided and attached to the top wall 120.

FIG. 4 discloses a detailed side view of the deflector baffle 12 and riser 4 of the present invention. An open bottom 15 of deflector baffle 12 has a continuous circumference as shown in FIG. 4. FIG. 4 shows that the deflector 12 is a solid cap through which both cracked hydrocarbons and catalyst exit from the bottom 15.

FIG. 5 shows a deflector baffle 112 which is a modification of deflector baffle 12 of FIG. 4. Deflector baffle 112 has slots 130 and teeth 132 along the perimeter at its open bottom 116. A portion of the cracked hydrocarbon vapor discharges through the slot 130 and passes upwardly away from the downwardly directed catalyst. This causes some separation of the catalyst and cracked hydrocarbon vapor prior to discharging the catalyst through the bottom 116.

FIG. 6 shows a deflector baffle 213 which is a modification of deflector baffle 12 of FIG. 4. FIG. 6 shows locating deflector baffle 213 a distance above a riser 204 and axially aligned with riser 204. Thus riser 204 is not inserted into deflector baffle 213.

Figure 7:
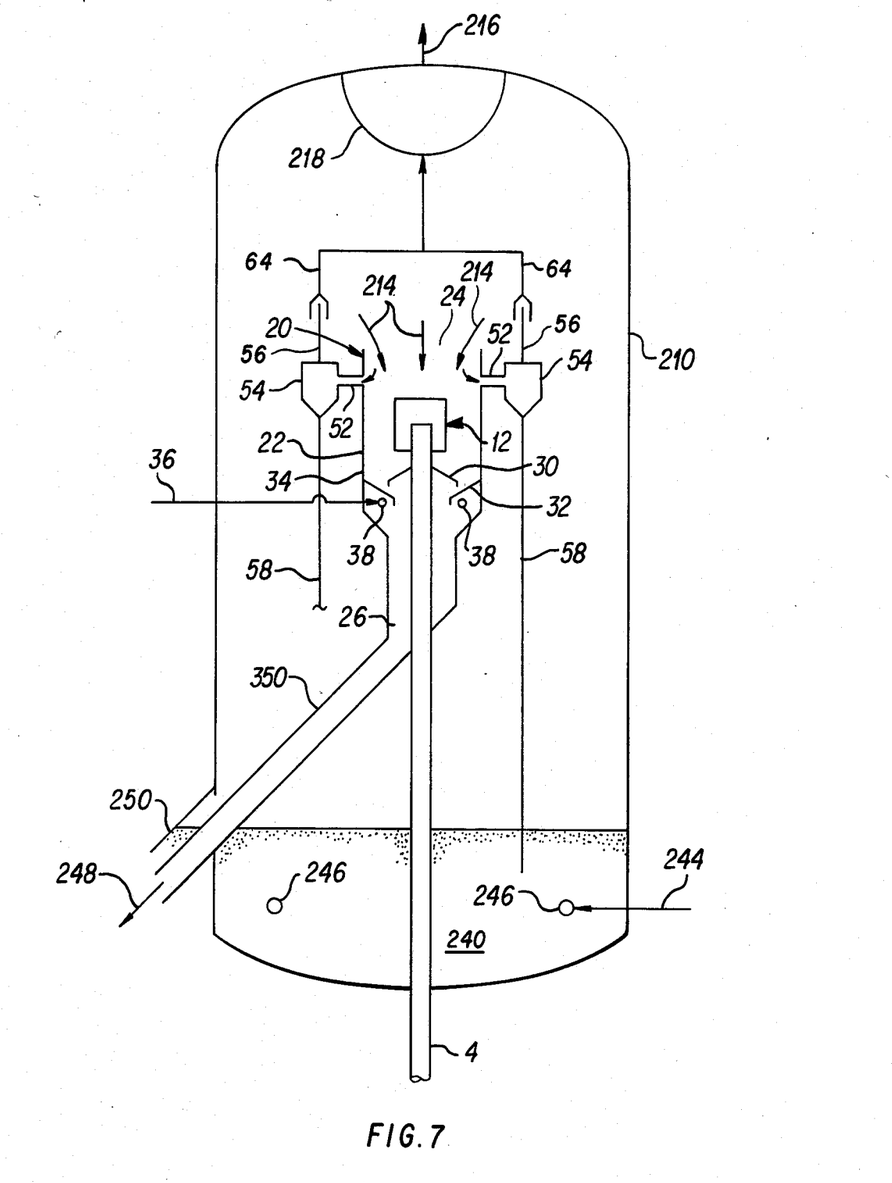
FIG. 7 is a side view of a third embodiment of the present invention which is a modification of the embodiment of FIG. 1.

FIG. 7 discloses the embodiment of FIG. 1 with modifications to the stripping vessel 20 and a disengaging vessel 210. Stripped catalyst from the first stripping zone defined within lower portion 34 passes into a stripping vessel catalyst exit conduit 350 and is directly discharged from the disengaging vessel 210. Thus, the catalyst from the first stripping zone does not pass through a catalyst bed 240 located within the disengaging vessel 210. Catalyst in the bed 240 is stripped by contact with stripping gas from a second stripping gas conduit 244 attached to a second stripping gas header 246. The catalyst from conduit 350 and bed 240 pass through a catalyst exit conduit 250 as a catalyst exit stream 248. Stream 248 passes to catalyst regeneration or optionally an additional stripping vessel (not shown).

A disengaging vessel atmosphere stream 214 passes into the stripping vessel 20 through the opening 24 and combines with hydrocarbons stripped away from the catalyst in the lower portion 34 of the vessel 20. The combined gas stream then passes through the cyclone inlet conduit 52, cyclone 54, cyclone overhead conduit 56 and enclosed conduit 64 to a plenum chamber 218 and then is discharged through disengaging vessel overhead conduit 216. Catalyst separated from the combined stream by cyclone 54 passes through the dipleg 58 to the catalyst bed 240.

Figure 8:
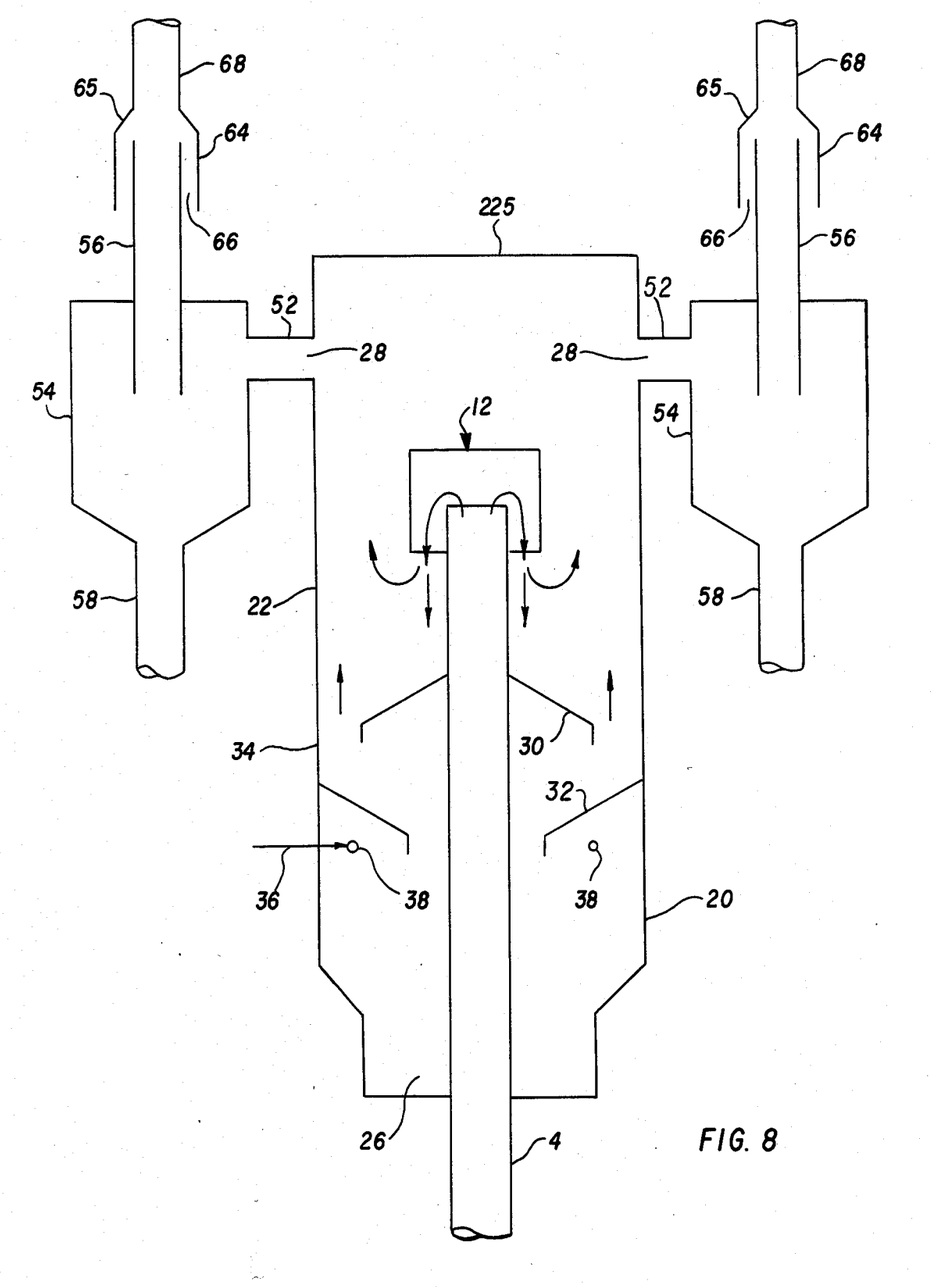
FIG. 8 is a fourth embodiment of the present invention which is a modification of the embodiment of FIG. 2.

FIG. 8 shows a modification of the embodiment of FIG. 2. In FIG. 8, a top wall 225 is attached to the vessel 20. This closes the opening 24 shown in FIG. 2.

Figure 9:
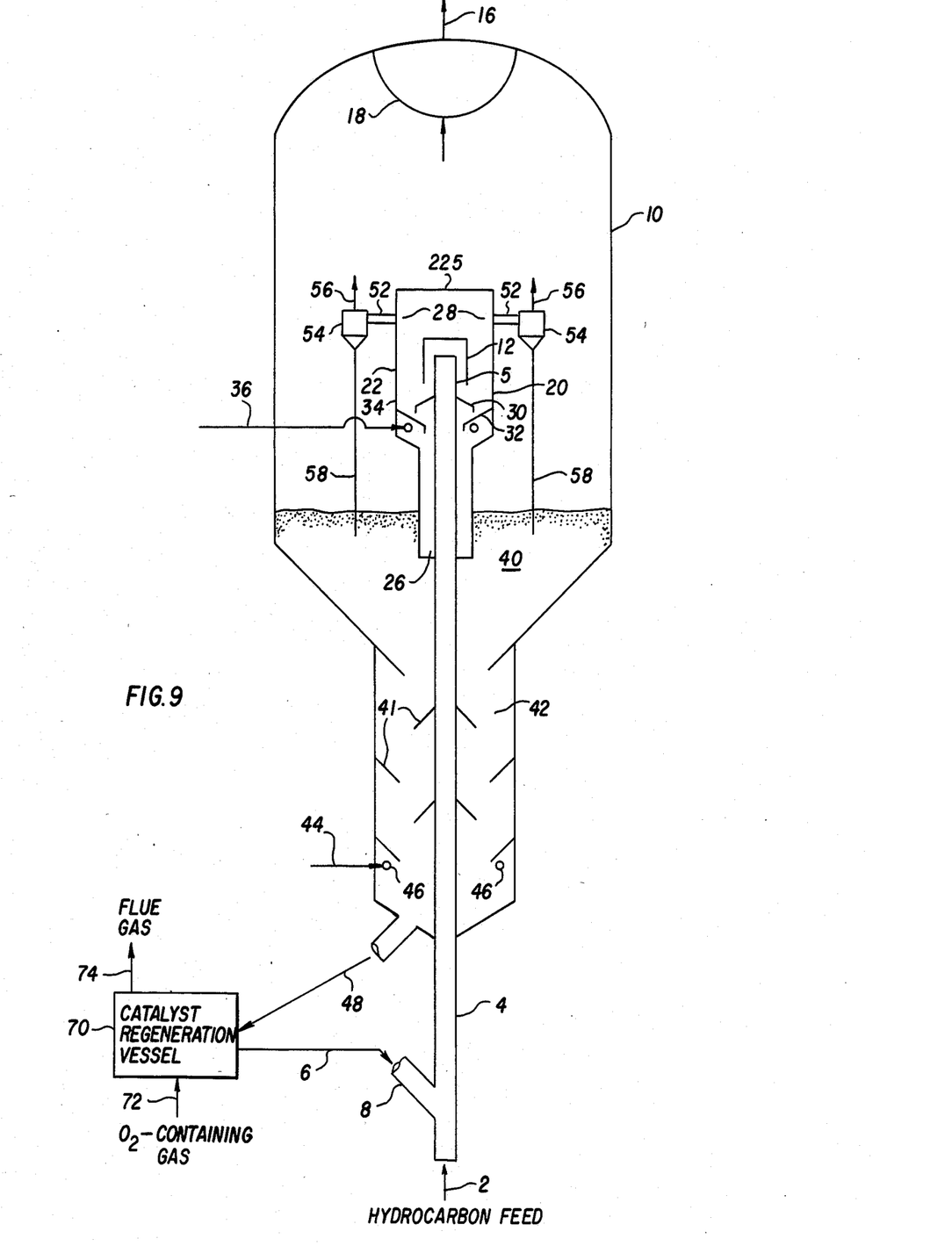
FIG. 9 is a fifth embodiment of the present invention which is a modification of the embodiment of FIG. 1.

FIG. 9 shows a modification of the embodiment of FIG. 1. In FIG. 9, the cyclone 54 discharges the gaseous remainder through the cyclone overhead conduit 56 into the atmosphere of the disengaging vessel 10.

Thus this embodiment employs an open cyclone system. Then the gasiform material in the disengaging vessel atmosphere passes into the plenum chamber 18 and discharges through conduit 16 from the chamber 18.

The arrangement of the present invention provides many advantages. By preferably providing a closed cyclone system, the present invention minimizes contact of cracked hydrocarbon product with catalyst. By employing a deflector baffle, rather than a riser cyclone, the present invention achieves an initial separation of catalyst and cracked hydrocarbon product quicker than directly discharging catalyst from the riser into a riser cyclone. Furthermore, the catalyst passes to a stripping zone quicker than if it had to first pass to a riser cyclone. By employing a stripping vessel located within a disengaging vessel, the first stripping zone can be a shorter residence time than required by the entire disengaging vessel.

The embodiment of FIG. 1 particularly has advantages because employing a deflector baffle, that looks like a large bubble cap, and employing a stripping vessel, is economical to construct. Furthermore, only clean stripping gas from outside of the disengaging vessel passes into the first stripping zone in a lower portion of the stripping vessel. This reduces contact of the main hydrocarbon vapor product, comprising stripped hydrocarbons and vapor from the disengaging vessel atmosphere, with catalyst and thus reduces overcracking. Furthermore, this minimizes undesirable entrainment of catalyst upwardly away from the first stripping zone because only stripping gas passes into the first stripping zone, as opposed to stripping gas and vapor from the disengaging vessel atmosphere.

The embodiment of FIG. 3 has additional advantages. It provides a narrower opening at the top of the stripping vessel to assist in preventing backflow of vapor from inside the stripping vessel 20 to the disengaging vessel atmosphere.

The slotted deflector baffle shown by FIG. 5 has an additional advantage. It provides increased separation of catalyst from cracked hydrocarbon vapor prior to passing the catalyst to the first stripping zone.

Locating the deflector a distance above the riser, as in FIG. 6, illustrates the flexibility of the present invention.

The embodiment of FIG. 7 has the particular advantage of reducing catalyst inventory in the disengaging vessel by directly passing catalyst from the first stripping zone to outside the disengaging vessel. This reduces the amount of catalyst in the atmosphere of the stripping vessel and thus reduces the amount of catalyst which can contact with hydrocarbons in the stripping vessel atmosphere.

The embodiment of FIG. 8 minimizes contact time of gasiform material from the atmosphere of the disengaging vessel and gaseous hydrocarbon product by adding the gasiform material to the gaseous hydrocarbon product only after the gaseous hydrocarbon product discharges from the riser cyclone. Also adding gasiform material to the gaseous hydrocarbon product after the product discharges from the cyclone, rather than before, results in a smaller cyclone and avoids contacting the gasiform material with the catalyst in the cyclone.

The embodiment of FIG. 9 illustrates that the present invention has the flexibility to be employed with an open cyclone system and still result in quick separation of catalyst from gaseous hydrocarbon product.

While specific embodiments of the process and apparatus aspects of the invention have been shown and described, it should be apparent that many modifications can be made thereto without departing from the spirit and scope of the invention. Accordingly, the invention is not limited by the foregoing description, but is only limited by the scope of the claims appended thereto.

We claim:

1. A fluid catalytic cracking process comprising the steps of:
   (a) passing hydrocarbon feed and catalyst into an upstream end of an elongated tubular riser, comprising sidewalls, at fluid catalytic cracking conditions to produce a gasiform mixture of catalyst and cracked hydrocarbon;
   (b) upwardly discharging said mixture from a downstream end of said riser into a deflector baffle, said downstream end terminating within said deflector baffle, said deflector baffle comprising first cylindrical sidewalls attached to a top wall, said top wall being located above said riser downstream end, a circumference of a bottom of said first cylindrical sidewalls having slots cut therein, said riser sidewalls and said baffle sidewalls defining a first annular opening therebetween, said deflector baffle being located within a stripping vessel comprising second cylindrical sidewalls and a top wall, said stripping vessel located within a disengaging vessel, an atmosphere of said disengaging vessel being separate from an atmosphere of said stripping vessel, said deflector baffle being spaced from said riser downstream end and said stripping vessel;
   (c) downwardly deflecting said discharged mixture by contact with said deflector baffle top wall without passing said discharged mixture into said disengaging vessel atmosphere, downwardly passing a major portion of said deflected mixture through said first annular opening towards a first catalyst stripping zone located within said stripping vessel, and passing a minor portion of said deflected mixture through said slots, said deflector baffle being located a distance above said stripping zone;
   (d) injecting stripping gas from outside said disengaging vessel directly into said first stripping zone;
   (e) stripping said downwardly deflected catalyst in said first stripping zone by contact with a stream consisting essentially of said stripping gas on trays located within said first stripping zone to produce a stripped vapor stream, comprising vapor and entrained catalyst, and a stripped catalyst stream;
   (f) passing said stripped vapor stream through a conduit attached to an opening in an upper portion of said stripping vessel sidewalls, to a cyclone located outside said stripping vessel, wherein said catalyst in said first stripping zone passes from said riser to said baffle and to said first stripping zone without contacting said opening in said upper portion of said stripping vessel sidewalls and, wherein a portion of said cracked hydrocarbon immediately separates from said downwardly deflected mixture when it passes out of said deflector baffle and passes into said atmosphere of said stripping vessel and then into said cyclone;
   (g) separating a portion of catalyst from said stripped vapor stream in said cyclone to form a separated catalyst stream and a vapor product stream;

(h) passing said vapor product stream from said cyclone through a cyclone overhead conduit directly into a closed conduit;

(i) passing a disengaging vessel vapor stream from said disengaging vessel atmosphere through an annulus defined between said cyclone overhead conduit and said closed conduit;

(j) combining said disengaging vessel vapor stream and stripped vapor stream in said closed conduit to form a combined vapor stream;

(k) passing said combined vapor stream through said closed conduit directly to outside said disengaging vessel atmosphere; and (l) passing said stripped catalyst stream from said stripping vessel to a second stripping zone located within said disengaging vessel and below said first stripping zone.

2. A fluid catalytic cracking process comprising the steps of:

(a) passing hydrocarbon feed and catalyst into an upstream end of an elongated tubular riser at fluid catalytic cracking conditions to produce a gasiform mixture of catalyst and cracked hydrocarbon;

(b) upwardly discharging said mixture from a downstream end of said riser into a deflector baffle located over said riser downstream end;

(c) downwardly deflecting said discharged mixture, by contact with said deflector baffle out of said baffle and then passing said deflected mixture through an entire outside perimeter of said riser downstream end, towards a first catalyst stripping zone located within a stripping vessel, said deflector baffle being located within said stripping vessel and a distance above said first stripping zone, said stripping vessel being located within a disengaging vessel, said deflector baffle being spaced from said riser downstream end and said stripping vessel, wherein said riser downstream end terminates within said deflector baffle, said upward mixture is downwardly deflected by a top wall of said deflector baffle and said downwardly deflected mixture discharges from said deflector through an annular opening defined between said riser and a sidewall of said deflector baffle, said deflector baffle sidewall being attached to said deflector baffle top wall;

(d) injecting stripping gas from outside said disengaging vessel directly into said first stripping zone;

(e) stripping said downwardly deflected catalyst in said first stripping zone by contact with a stream consisting essentially of said stripping gas on trays located within said first stripping zone to produce a stripped vapor stream, comprising vapor and entrained catalyst, and a stripped catalyst stream;

(f) passing said stripped vapor stream upwardly from said first stripping zone, and passing said stripped vapor stream from said stripping vessel through a conduit attached to a first opening in said stripping vessel to a cyclone located outside said stripping vessel, wherein a portion of said cracked hydrocarbon immediately separates from said downwardly deflected mixture when it passes out of said deflector baffle and passes into an atmosphere of said stripping vessel and then into said cyclone, wherein said downwardly deflected catalyst passes from said riser to said baffle and then to said first stripping zone without contacting said first opening;

(g) separating a portion of catalyst from said stripped vapor stream in said cyclone to form a separated catalyst stream and a vapor product stream;

(h) passing said vapor product stream from said cyclone to outside said disengaging vessel; and (i) passing said stripped catalyst stream from said stripping vessel to a second stripping zone located within said disengaging vessel and below said first stripping zone.

3. The process of claim 2, wherein said entire downwardly deflected mixture discharges from said baffle through the bottom of said annular opening.

4. The process of claim 2, wherein a portion of vapor is separated from said downwardly deflected mixture by passing through slots, along a perimeter of the bottom of said baffle, with a remainder of said downwardly deflected mixture continuing downwardly to said first stripping zone.

5. The process of claim 2, further comprising passing a disengaging vessel vapor stream from an atmosphere of said disengaging vessel directly into a closed conduit located outside said stripping vessel, wherein said vapor product stream formed in said cyclone passes directly from a cyclone overhead conduit of said cyclone into said closed conduit, said disengaging vessel vapor stream and said vapor product stream combining in said closed conduit to form a combined stream, said combined stream discharges from said closed conduit directly to outside said disengaging vessel atmosphere.

6. The process of claim 5, wherein said disengaging vessel atmosphere is separate from said atmosphere of said stripping vessel.

7. The process of claim 2, further comprising passing a disengaging vessel vapor stream from an atmosphere of said disengaging vessel into said stripping vessel through a second opening in an upper portion of said stripping vessel, combining said disengaging vessel vapor stream and said stripped vapor stream in said stripping vessel to form a combined vapor stream and passing said combined vapor stream into said cyclone, wherein pressure in said stripping vessel upper portion is lower than that of said disengaging vessel atmosphere.

8. The process of claim 7, wherein said combined vapor stream passes from said stripping vessel to said cyclone through said conduit attached to said first opening and said first opening is in said upper portion of said stripping vessel.

* * * * *